(12) United States Patent
Roy et al.

(10) Patent No.: US 11,031,998 B2
(45) Date of Patent: Jun. 8, 2021

(54) BONDING AND REDUNDANCY FOR SATELLITE TRANSPORT PATHS

(71) Applicants: Satyajit Roy, Gaithersburg, MD (US); George Choquette, Potomac, MD (US)

(72) Inventors: Satyajit Roy, Gaithersburg, MD (US); George Choquette, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 186 days.

(21) Appl. No.: 16/155,549

(22) Filed: Oct. 9, 2018

(65) Prior Publication Data
US 2020/0112362 A1    Apr. 9, 2020

(51) Int. Cl.
*H04B 7/185* (2006.01)
*H04W 24/10* (2009.01)

(52) U.S. Cl.
CPC ........ *H04B 7/18513* (2013.01); *H04W 24/10* (2013.01)

(58) Field of Classification Search
CPC ............................ H04B 7/18513; H04W 24/10
See application file for complete search history.

(56) References Cited

U.S. PATENT DOCUMENTS

| | | | |
|---|---|---|---|
| 9,264,353 B2 * | 2/2016 | Krishnaswamy | H04L 47/193 |
| 2003/0123481 A1 * | 7/2003 | Neale | H04L 47/193 370/466 |
| 2013/0077501 A1 | 3/2013 | Krishnaswamy et al. | |
| 2018/0191604 A1 | 7/2018 | Bartlett et al. | |

FOREIGN PATENT DOCUMENTS

| | | | |
|---|---|---|---|
| EP | 1175050 A2 * | 1/2002 | |
| EP | 1175050 A3 | 8/2003 | |
| EP | 1175050 B1 | 3/2006 | |
| EP | 1786153 A2 | 5/2007 | |

OTHER PUBLICATIONS

International search report for International Application No. PCT/US2019/055024.
Taleb et al: "Explicit Load Balancing Technique for NGEO Satellite IP Networks With On-Board Processing Capabilities", IEEE/ACM Transactions on Networking, IEEE/ACM, New York, NY, US, vol. 17, No. 1, Feb. 1, 2009, pp. 281-293, XP011246763, ISSN: 1063-6692.
International Search Report for PCT Application No. PCT/US2019/055015.
Notice of Allowance dated Jul. 24, 2020 for U.S. Appl. No. 16/155,586.

* cited by examiner

*Primary Examiner* — Ricky Q Ngo
*Assistant Examiner* — Stephen N Steiner
(74) *Attorney, Agent, or Firm* — Capitol City Techlaw; Joseph Ruch (57) ABSTRACT

A method for using multiple communication paths in a satellite network is disclosed. The method including: initiating a connection request from a first peer to a second peer; providing communication paths between the first peer and the second peer; retrieving a policy corresponding to the communication paths, the first peer and the second peer; receiving a transport metric for at least one of the communication paths; selecting a path from the communication paths based on a connection metric, the transport metric and the policy; and establishing a connection between the first peer and the second peer with the path, wherein at least one of the communication paths is relayed by a satellite.

19 Claims, 6 Drawing Sheets

BONDING AND REDUNDANCY FOR SATELLITE TRANSPORT PATHS

FIELD

A system and method to provide bonding and redundancy functionality using multiple communication paths in a satellite-only network or hybrid satellite-terrestrial network is disclosed. In particular, the system and method provide policy-based bonding and redundancy ability that is satellite transport and link aware. Switching between multiple links based on end to end path availability while providing TCP spoofing function is also disclosed.

BACKGROUND

In a satellite communication system, bonding and redundancy using multiple communication links from a remote site is known. However, the bonding and redundancy solutions are not transport and link network aware. As such, the prior art bonding and redundancy solutions fail to take advantage of the network and link state.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A method for using multiple communication paths in a satellite network is disclosed. The method including: initiating a connection request from a first peer to a second peer; providing communication paths between the first peer and the second peer; retrieving a policy corresponding to the communication paths, the first peer and the second peer; receiving a transport metric for at least one of the communication paths; selecting a path from the communication paths based on a connection metric, the transport metric and the policy; and establishing a connection between the first peer and the second peer with the path, wherein at least one of the communication paths is relayed by a satellite.

Additional features will be set forth in the description that follows, and in part will be apparent from the description, or may be learned by practice of what is described.

DRAWINGS

In order to describe the way, the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail using the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced item. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings a system and method for providing bonding and redundancy using multiple communication paths in a satellite-only network or hybrid satellite-terrestrial network. The bonding and redundancy may be policy based, and satellite transport and link aware. In some embodiments, a traffic flow or session may move around/between multiple available paths.

The present teachings use an exemplary two path architecture, but the disclosure is applicable where more than two paths are available. In some embodiments, from the network layer perspective, claims are similarly applicable to Layer 3 and Layer 2 traffic including varieties of Layer 3 IP protocols.

Figure 1A:
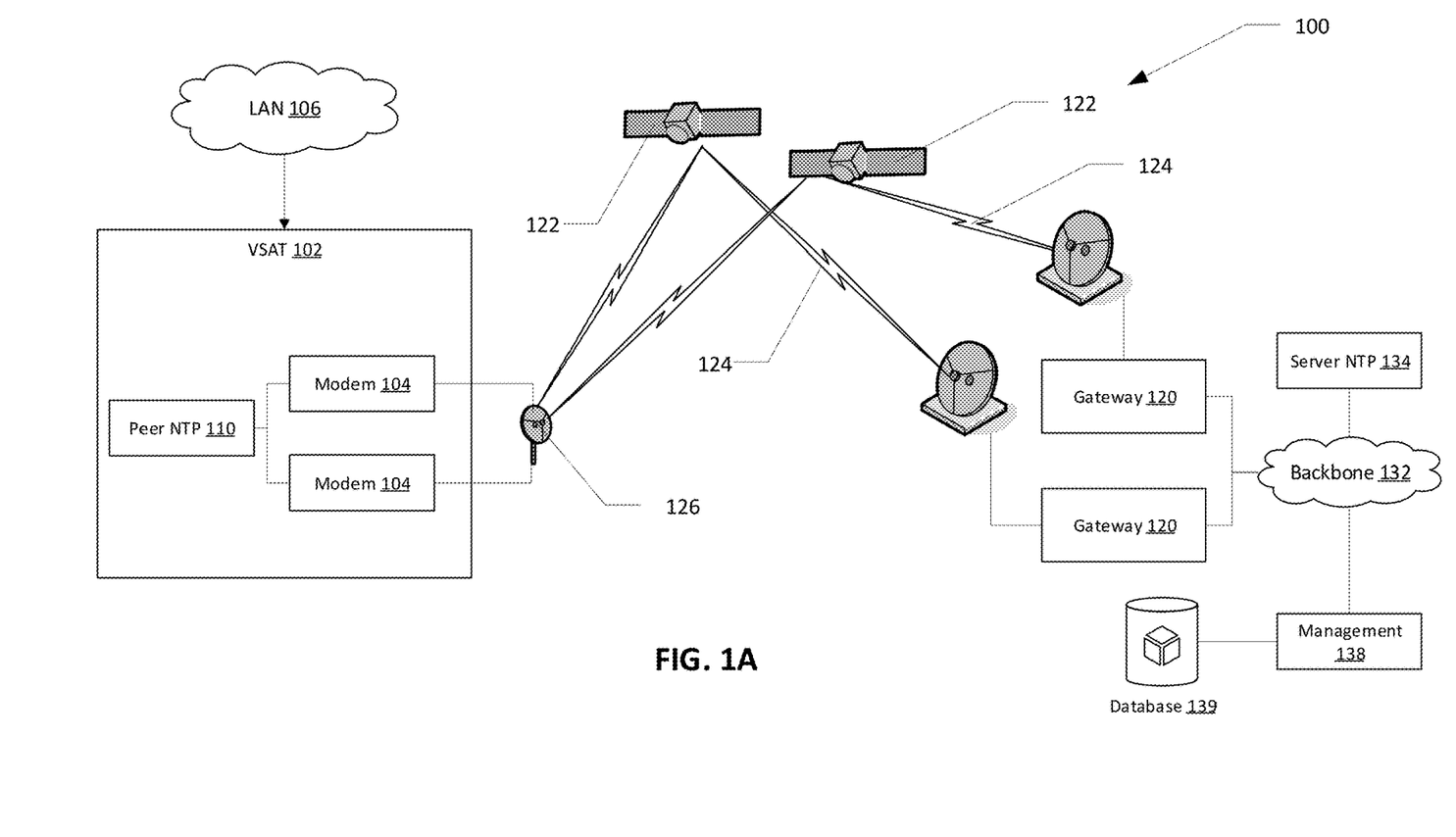
FIG. 1A illustrates an exemplary network including multiple network paths.

FIG. 1A illustrates an exemplary network including multiple network paths.

A network 100 may include a VSAT 102 (or an indoor unit (IDU) connected to a peer Network Transport Processor (NTP) 110 for establishing network paths 124. The peer NTP 110 may logically, physically or functionally include modems 104. In exemplary embodiments, the peer NTP 110 may be connected to a Local Area Network (LAN) 106. The peer NTP 110 may maintain IP addresses for devices (not shown) connected to the LAN 106 across the network paths 124.

The modems 104 may have one to one correspondence with network paths 124. In exemplary embodiments, the peer NTP 110 and the modems 104 may be hosted in one box or device. In exemplary embodiments, the peer NTP 110 and the modems 104 may be hosted in multiple boxes or devices. In exemplary embodiments, the peer NTP 110 may be disposed in a first device (not shown) while the modems 104 may be disposed in a second device (not shown) different than the first device. In exemplary embodiments, the peer NTP 110 and each of the modems 104 may be hosted in a different device.

In exemplary embodiments, communication link characteristics of each of the network paths 124 can take various forms. The network paths 124 may be of same characteristics or can be different. The network paths 124 may be in different carrier frequency bands, for example, Ka, Ku, L, X, or V bands. The network paths 124 may be different in type, for example, cellular, satellite or terrestrial. The network paths 124 may be relayed through different satellite constellations, for example, Geosynchronous Earth Orbit (GEO), Medium Earth Orbit (MEO), Low-Earth Orbit (LEO), multiple satellites of same constellation, or the like. The network paths 124 may use different satellite transport types, for example, Time Division Multiple Access (TDMA), Single Channel per Carrier (SCPC), or the like. For clarity, SCPC in this disclosure indicates a carrier having a single transmitter and one or more receivers, for example using the DVB-S2 standard or some other format, and TDMA indicates a carrier shared by one or more transmitters on a time plan basis.

An antenna installation 126 may be determined by the choice or characteristics of network paths 124. For example, the antenna installation 126 may include a parabolic antenna, a phased-array antenna, multiple antennas, or the like. In some embodiments, a phased array or mechanically steered/tracking antenna may be used to hop between satellites. In some embodiments, an outdoor unit with multi-carrier capability may be used. The network paths 124 from a single remote site may land on a single hub/gateway 120 or different hub/gateways 120. The different gateways 120 may be co-located or may be geographically separated.

By using different types of links, for example, different antennas, different transport types, different carrier frequency bands, and the like, the network paths 124 may provide look-angle diversity, rain propagation path diversity and redundancy. With these variations, there can be large number of different configurations possible. The embodiments disclosed herein present a few of configuration options to effectuate a transport aware redundancy and bonding network 100.

In some embodiments, the network 100 may include two satellites 122 of the same type and switching between them occurs. In some embodiments, the network 100 may use an antenna installation 126 (Outdoor Unit (ODU)) with a single antenna. The network paths 124 may be served by geographically distributed Hub/Gateways 120. A server NTP 134 may connect the LAN 106 to an external network 136, such as, the Internet. The server NTP 134 may be deployed in a backbone 132 to connect with the external network 136. The server NTP 134 may keep network addressing, for example, Internet Protocol (IP) addresses, intact across movement between the networking paths 124. In such a network 100, network access redundancy, look-angle diversity, rain propagation path diversity, congestion avoidance, congestion level, mobility, handover and the like may be provided. Hub/gateways 120 connect to the server NTP 134 to maintain IP addressing between the LAN 106 and the external network 136 (see FIG. 1B). The carrier frequency band for the network paths 124 may be the same, for example, the Ka band. In some embodiments, the carrier frequency for the network paths 124 may be different. The peer NTP 110 uses awareness of the transport links for selection of a network path 124.

The network functions implemented by the server NTP 134 include TCP spoofing, header and payload compression and other satellite optimization aspects. The server NTP 134 provides transport aware Policy based routing. The server NTP 134 on a hub/gateway side of the network paths 124 may provide the same functions on a link from the gateway 120 to the VSAT 102 (also known as a forward link). The transport state awareness bonding helps in better QoS, maintaining capacity efficiency and performance throughput for the network paths 124. The transport state may use metrics such as Packet Loss Rate (PLR), Modulation and Coding (MODCOD), congestion level, interface cost, latency, jitter. In exemplary embodiments, a Network Management System (NMS) 138 may connect to the server NTP 134 via the backbone 132. In exemplary embodiments, the NMS 138 may connect to the peer NTP 110 via one or more of the network paths 124. The NMS 138 may manage a database 139 including, for example, NTP policies, NTP firmware, NTP software, or the like.

Figure 1B:
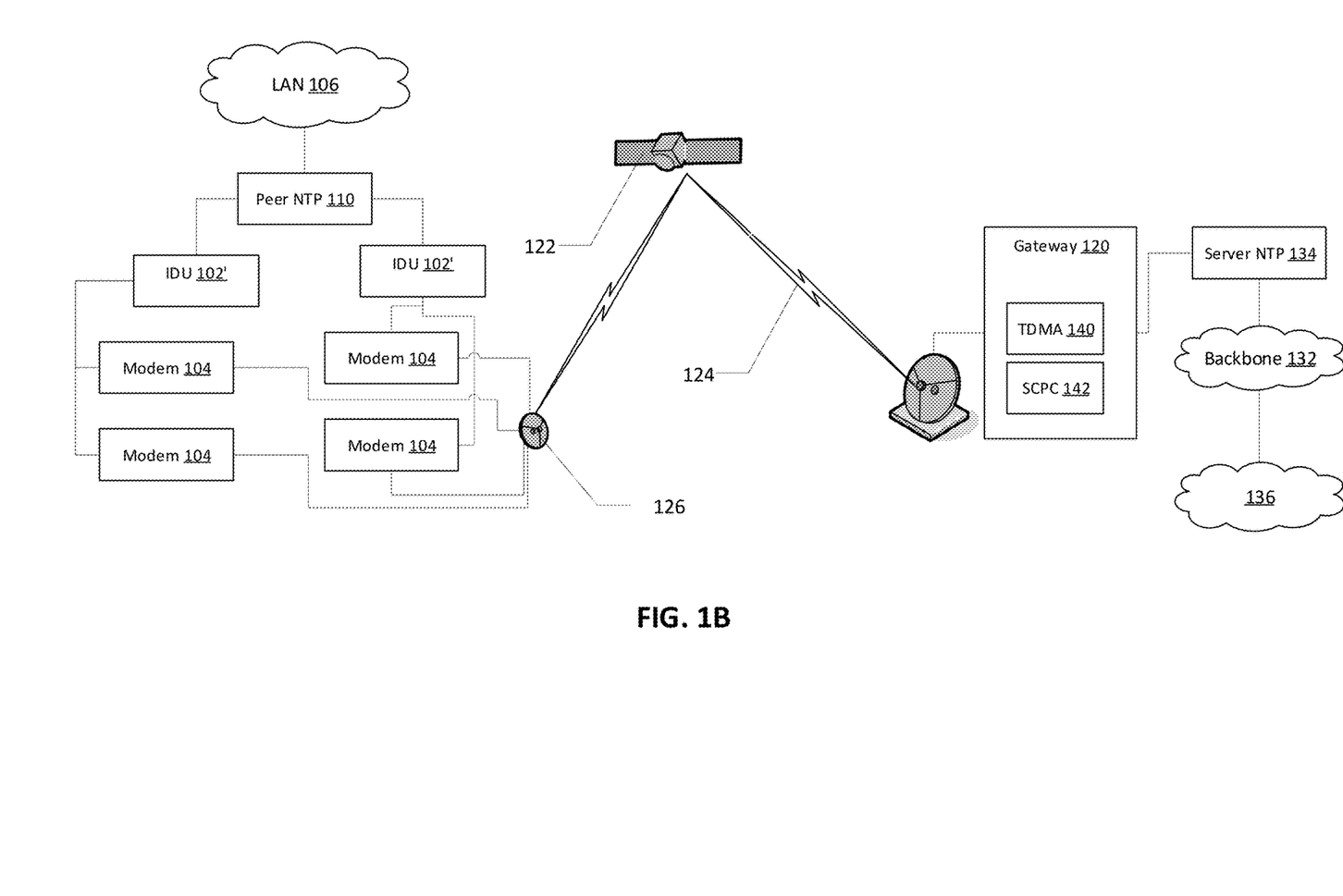
FIG. 1B illustrates an exemplary network including multiple network paths.

FIG. 1B illustrates an exemplary network including multiple network paths.

In FIG. 1B, the paths 124 are provided by using different transport types. For example, the network paths 124 may include a Time Division Multiple Access (TDMA) path using a TDMA unit 140 and a Single Channel per Carrier (SCPC) using a SCPC unit 142. The TDMA unit 140 and the SCPC unit 142 are connected to the server NTP 134 to provide a transport type agnostic view to the backbone 132. In exemplary embodiments, the TDMA unit, the SCPC unit 142, and the server NTP 134 may be co-hosted with the gateway 130, and the different transport type paths land on one gateway. In the embodiment of FIG. 1B, the gateway 120 connects to the backbone 132 via the server NTP 134, rather than directly to the backbone 132 as illustrated in FIG. 1A.

Figure 1C:
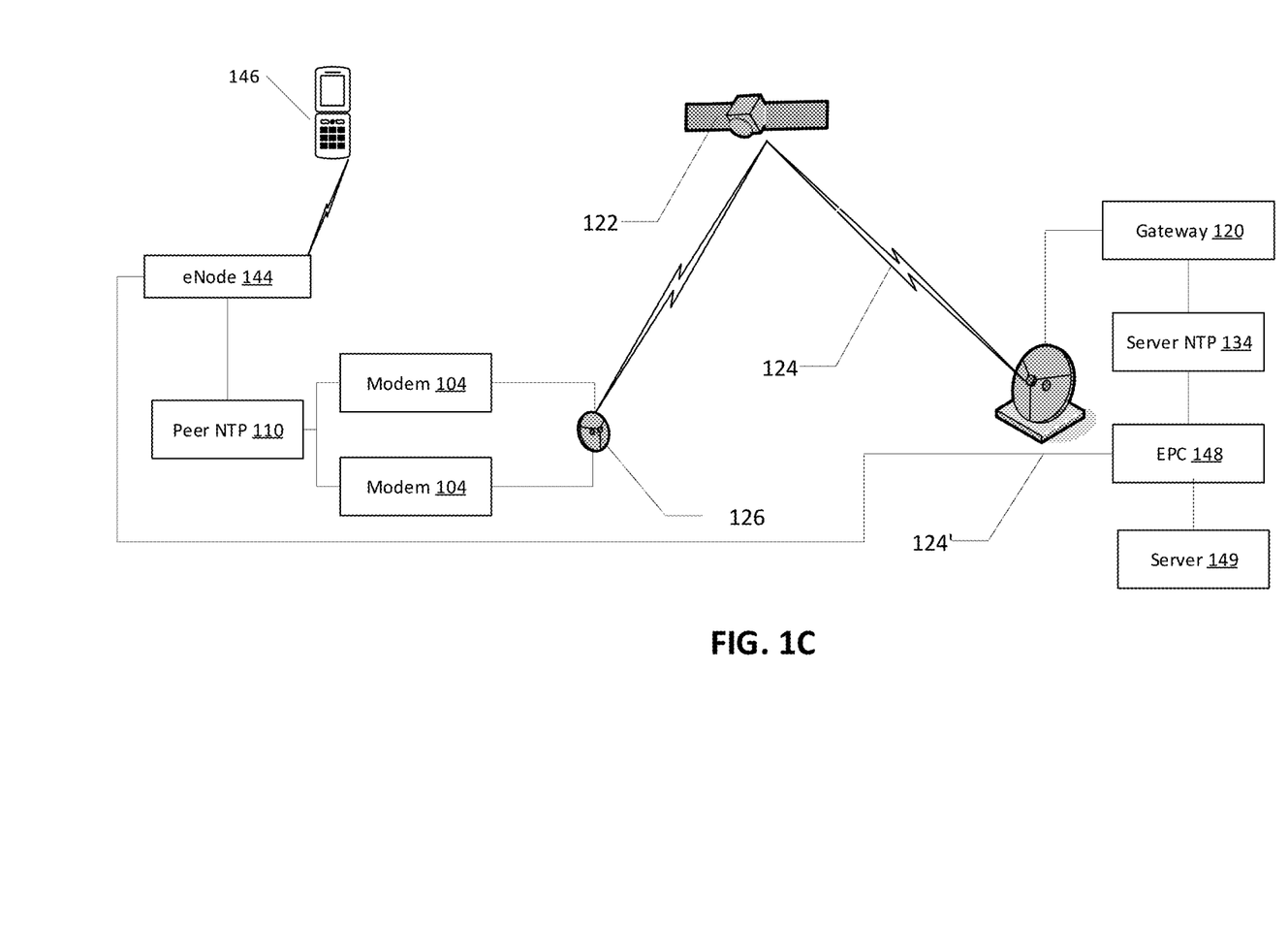
FIG. 1C illustrates an exemplary network including multiple network paths.

FIG. 1C illustrates an exemplary network including multiple network paths.

In this configuration, an enhanced Node B (eNodeB) 144 and an EPC 148 are provided with NTP functionality. In this embodiment, the NTP functionality is implemented in the eNodeB and the EPC 148. One of the network paths 124 is relayed via the satellite 122, while one of the network paths 124 (identified as 124' in FIG. 1C) is a terrestrial path. The path selection from network path 124 or network path 124' of a communication from the EPC 148 and/or the eNodeB 144 is policy based by the NTP functionality. The network 100 of FIG. 1C may connect a terminal (wired or wireless) 146 to a server 149, for example, an Internet of Things (IoT) server. The NTP may use a transport metric to provide network access redundancy, policy based smart routing of traffic through a path, path diversity etc. The policy may use the network path 124 relayed by a satellite for bulk or latency-insensitive traffic, as well as for a backup for voice and other latency or jitter sensitive traffic, and for overflow if network path 124' is congested. The policy may use the terrestrial path 124' for voice and other latency or jitter sensitive traffic, and for overflow if network path 124 is congested. The policy may be cost based, congestion based, or the like.

Management Access

As illustrated in FIG. 1A, a management path to the peer NTP 110 and/or the server NTP 134 may be provided. The management path may be used for software and configuration download. In exemplary embodiments, an endpoint of the management path is anchored at the server NTP 134 when there are networking paths 124. Management and diagnostic access to the peer NTP 110 always traverses through the NMS 138 (see FIG. 1A). Management packets, for example, software download, configuration parameters, control commands or the like, may be replicated or duplicated on the network paths 124 by the NMS 138 or the server NTP 134. The NMS 138 may be connected to the backbone 132. In some embodiments, the NMS may be directly connected to the server NTP 134 (not shown).

Assuming two paths bonding for the network paths 124, based on the connectivity availability from the modems 104, the peer NTP 110 may receive either both copies or one copy (for example, when one path is down or lost or preferred). Then the peer NTP 110 filters the duplicated traffic and routes the management traffic to the appropriate module (for example, modem, an NTP processor) in the network 100. In a multi-NTP configuration of a remote site (two peer NTPs 110 deployed at one remote site and managed from the NMS 138 per FIG. 1B) the traffic is marked with the identity of a target IDU of the IDUs 102'. In some embodiments, the same management traffic is applicable to both the IDUs 102', for example, both the IDUs use the same software image. In this case, the NMS 138 may mark the traffic as multicast (not specific to any particular IDU) and so the same traffic may be sent to the IDUs 102' by the server NTP 134 upon receiving such type management traffic.

The present teachings allow for hitless software and/or configuration upgrade that may require a reboot to affect the upgrade. For a hitless upgrade, each modem or each peer NTP may be rebooted or restarted at different times after obtaining the software/firmware updates. While one modem (or peer NTP in a multi-NTP configuration) is restarting, the other modem (or peer NTP) may carry traffic using the older software. The peer NTP may initiate a modem (or peer NTP) restart when the other modem (or peer NTP) comes online. As such a remote site maintains availability during the period needed by a modem (or NTP) to restart, for example, after an upgrade.

In a multi-NTP configuration of a remote site (i.e., multiple peer NTPs 110 are deployed at the remote site per FIG. 1B), a management path access provides the NMS 138 connectivity when one of the peer NTPs loses connectivity with the gateway 120 (either inroute or outroute), the NMS 138 may reach the unconnected peer NTP via the other of the peer NTPs. As such, the NMS 138 may obtain useful information regarding issues and health of the peer NTP that has lost connectivity to an operator to view from the central location. Otherwise, physical presence of an operator is needed at the remote site which is not practical.

For super availability, one of the modems 104 (or communication link) may be connected via L-band transmission which is less rain attenuated than typical Ka and Ku bands. The NMS 138 may use the network path 124 via the L-band modem to reach the server NTP 134, the other IDU 102', or the other modem 104.

Virtual Network Operator:

A Virtual Network Operator (VNO) may rent satellite bandwidth in a High Throughput Satellite (HTS) network from a Host Networking Operator (HNO). As such, the VNO can provide bandwidth without investing in any physical assets or infrastructure, and thus accelerate a service setup time.

Multiple VNOs may provide service through the same site. In a multi-IDU configuration, a VNO may be assigned one or more IDUs. In a single-IDU configuration, the VNO may be assigned a communication path. An NTP may appropriately deliver received traffic based on the VNO identification. Each VNO may be assigned with a VNO ID to separate VNO traffic. At the site, multiple local networks are defined with, for example, VLAN IDs. One or more networks may correspond to a VNO or VNO ID. Each VNO may be assigned with one or multiple VLAN IDs. The common network device maintains the table of VLAN IDs and VNO IDs, and the association of an IDU or modem with a VNO. Traffic received from the local network and the NTP may route or forward traffic to the appropriate path based on the VLAN ID. Similarly, an NTP on a forward link may isolate VNO traffic through a predetermined path. In some embodiments, two separate terminal level subscriptions may be assigned to two VNOs even when operating from the same site.

Figure 2A:
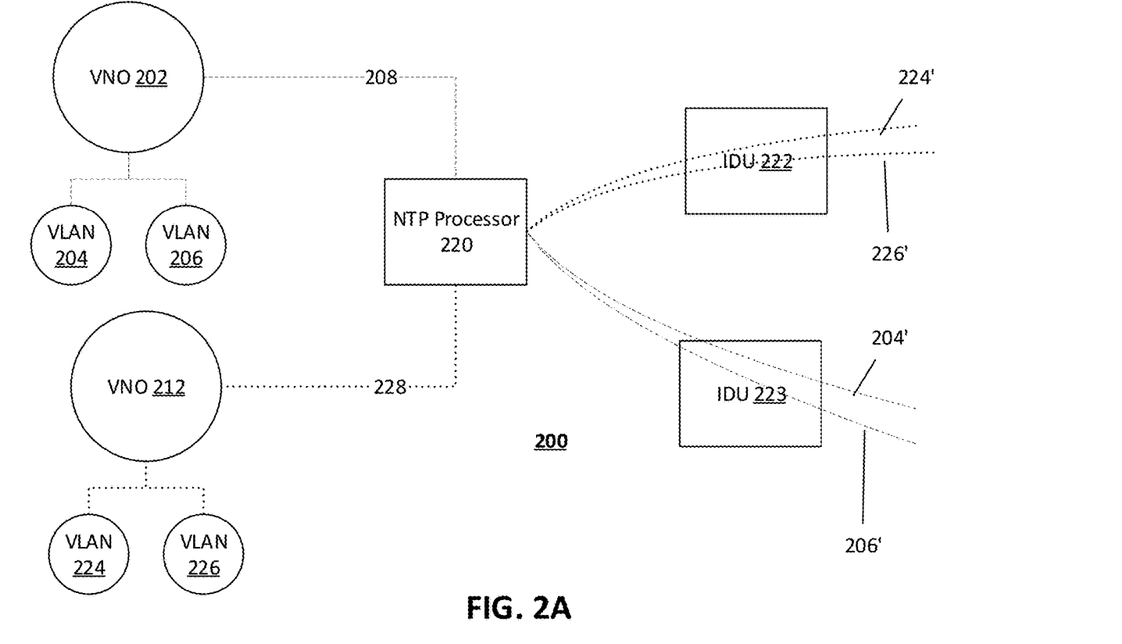
FIG. 2A illustrates two Virtual Network Operators (VNOs) at a remote site according to some embodiments.

FIG. 2A illustrates two Virtual Network Operators (VNOs) at a remote site according to some embodiments.

When a multi-link site 200 is deployed through two IDUs 222, 223 the site 200 can be provide service for a VNO 202 including two networks 204, 206, and a VNO 212 including two networks 224, 226. Traffic for VNO 202 may be received via a link 208 and traffic for VNO 202 may be received via a link 228. For an independent subscription on networks by VNOs 202, 212, a gateway (not shown) may separately control bandwidth (BW) usage by each VNO 202, 212 and allocate bandwidth to a link in a multi-link environment. For example, an NTP may direct all traffic for the VLAN 204, 206 for VNO 202 to use IDU 222 over links 204', 206', and traffic for the VLAN 224, 226 to VNO 212 may use IDU 223 over links 224', 226'.

Figure 2B:
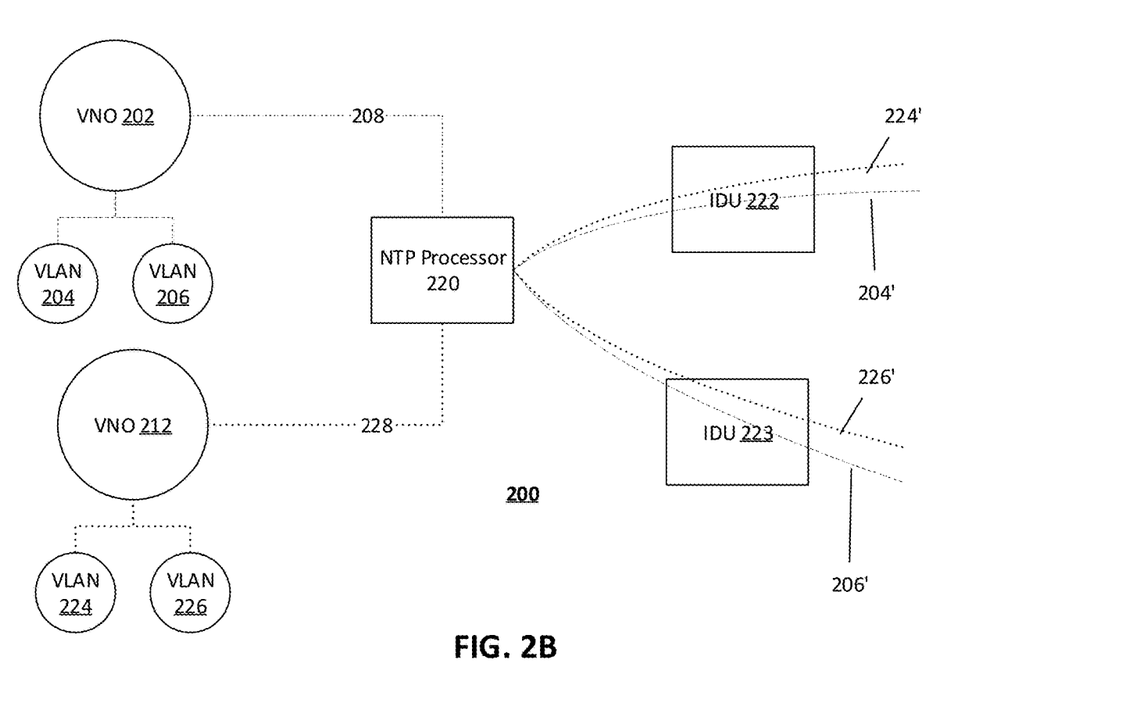
FIG. 2B illustrates two Virtual Network Operators (VNOs) at a remote site according to some embodiments.

FIG. 2B illustrates two Virtual Network Operators (VNOs) at a remote site according to some embodiments.

In some embodiments, multiple VNOs share a site. Traffic from two VNOs may be distributed among the multiple paths so that the VNOs get their best possible experience through the site. An aggregate subscription may be assigned to the remote site to govern how much traffic from each VNO is scheduled, and to determine how flows are distributed from each of the VNOs. A VNO may send multiple flows through the site. A bandwidth allocator on the network, for example, in a gateway may allocate bandwidth and may separately account for a minimum/guaranteed subscription of each. In some embodiments, the gateway may separately account for a maximum/BE subscription of the VNOs.

Link bandwidth availability on two paths may be variable over time due to, for example, link variation, congestion etc. A gateway, such as, a resource manager, monitors traffic from the VNOs. The gateway may ensure that the total traffic does not exceed the aggregated VNO BW subscription, that one VNO does not get more than a maximum subscription through the site, and that each VNO gets a minimum/guaranteed before a maximum subscription is allocated.

The gateway may provide load balancing for distributing allocation across the paths depending, for example, the current congestion condition, efficiency constraints, policy constraints, or the like. The NTP 220 may ensure that a VNO allocation may be achieved by distributing traffic flows from the VNOs between the paths in accordance with the allocation from the gateway resource manager. An analogous bandwidth allocation may be provided for the forward link traffic flows. As such traffic received via links 208, 228 may be distributed via IDU 222 and IDU 223.

Transport Aware IDU Bonding

Transport aware IDU bonding provides entities at a remote site and a gateway determine or select a traffic path based on a transport condition. The transport condition may be reflected in transport metrics of an inroute link, an outroute link, or both links. Some metrics listed below may not be usable together at the same time. Some of the metrics may be used as a group. Different metrics may be given different weights when determining or selecting a traffic path. Exemplary transport metrics may include:

inroute stream error rates on both inroute paths or through the IDUs
  inroute Transport Layer Queue depths and priority
  inroute Transport Layer Queue latency
  TDMA Vs SCPC link
  latency and jitter of inroute traffic on the paths
  congestion level in the inroute direction on the paths
  inroute Stream bandwidth assignment history on the paths
  the current inroute symbol rate, modulation and coding rates on the paths
  outroute SQF or signal strength on the paths
  outroute Transport Layer Queue depths and priorities
  outroute Transport Layer Queue latency
  outroute Packet Loss rates on the paths
  outroute congestion level on the paths
  the current outroute MODCODs (modulation and coding) on the paths
  the operational state code of the modem.

The NTP may receive link state information for each path from, for example, a modem. Inroute related transport information may be periodically propagated from each of the modems to the NTP. The network processor works around the transport information obtained from the modems to determine what route traffic through the available multi communication paths utilizes. As mentioned earlier, the multi-link communication links may provide high availability where traffic is always sent through a best current path. The NTP may provide load sharing with the links where the traffic is forwarded through the paths.

When availability is prioritized, the NTP may prefer the path with a lower error rate or packet loss, congestion rate, and has low latency and jitter. When load sharing, the selected path may be based on the traffic profile. For example, real time latency and jitter sensitive traffic may be preferably sent though the path providing minimum latency and jitter, and a lesser congestion level. When the traffic is not sensitive to latency and jitter but performs better with a lower packet loss rate, for example, best effort traffic, the selected path may have the lowest packet loss rate with a high latency and jitter to avoid or lower retransmissions.

In some embodiments, the NTP may include predictive analytics that rely on historical data. The NTP learns from the various transport related data to determine what type of traffic is sent through a path during a selected period. The analytics may be trained on the historical data and various probability distribution graphs may be calculated for characteristics of the paths. From these distribution graphs, the NTP may predict a characteristic of a specific path at a certain period based on the distribution graphs of the day, and may route specific traffic through specific available paths. In some embodiments, critical traffic that is in a small volume may be sent through a plurality of paths by replicating the traffic. The receiver may use a slip buffer to filter out the duplicate packets. A server NTP may perform similar predictive analysis for the outroute or forward link traffic.

From the predictive analytics, a routing cost may be calculated for each path. The routing cost may differ based on time of the day. For some subscriptions, payment or cost of the traffic usage directly depends on the cost of the path. For example, the subscribers may be charged more when the traffic is sent through a path at certain times of the day when cost of that path is very high. The high cost path may provide a better Quality of Experience (QoE) to the subscriber.

When one of the paths is TDMA and the other is a dedicated SCPC link, the NTP may send bit rate sessions that are more or less constant through the SCPC link, and send the time varying sessions or traffic flows via the TDMA link. This may provide better statistical multiplexing.

When the communication link has two different frequency bands, for example Ku and Ka, one path may be more rain susceptive than the other. When there is rain or rain prediction, the system may prefer high value, higher priority, critical or the like traffic through the lesser rain attenuated link or path.

In some embodiments, the present teachings may provide hitless handover in the network, for example, a satellite network. Prior to entering a new beam or region (in a satellite spot beam system, or a cell), one of the multiple paths may remain connected through the source/old beam while the other of the paths is being configured to tune to the target/new beam. In and overlapping beam/cell region, the path connected through the target beam will become available while the source path is still operational. When the source link becomes unavailable, the path tied to the source/old beam may be tuned to the target/new beam to provide both paths. As the other path is available through the target beam before losing the source link, a hitless or make before brake type of handover may be provided.

Fair Access Policy and Volume Usage

Fair Access Policy or volume usage in a consumer network disallows one user to consume the entire link volume or bandwidth. When a subscription bandwidth of the user is exceeded, the user's flows are throttled to a lower rate until a new anniversary period starts or an extra token is purchased. Irrespective of single or multiple networks, the paths may belong to different FAP plans. The NTP uses a current FAP status on the FAP plans. The FAP status on different paths can be one of the metrics for the policy-based routing of traffic through the paths. The weight for the Performance Based Routing (PBR) may be continuously re-adjusted based on the FAP status. For example, if one path is quickly reaching the volume usage quota, the amount of traffic through that path is restricted whereas through the other path more opening is done, i.e. the traffic goes faster. The re-adjustment takes place continuously and dynamically in the system. This could also be done on a QoS basis, where lower priority traffic is directed to the FAP throttled path and higher priority to the unthrottled path.

This FAP status-based policy-based routing is applicable to either direction—uplink or downlink.

CBR Calls or Latency/Jitter Sensitive Traffic:

a Session initiation protocol (SIP) based voice call may be treated as a Constant Bit Rate (CBR) session by allocating or reserving, for example, a 40 ms interval constant bandwidth on one of the paths. The SIP session establishment protocol may be sniffed by the satellite system to determine the amount of bandwidth to be reserved. This may provide for low jitter and better-quality voice call experience over the satellite. The present teachings provide better the connectivity for a latency/jitter sensitive application.

When a voice call is initiated one of the multiple paths may better serve a real time session. When, for example, LEO and GEO constellations are used for the paths, a LEO constellation may be the better choice path to carry the real-time sessions. Therefore, the NTP may choose the LEO path. However, the LEO path may get congested. Upon detecting congestion, the NTP may select a path other than the LEO path. In general, when bandwidth required for a real-time session cannot be reserved through one path, then the NTP a try the other paths for the session control. When enough bandwidth cannot be reserved through the paths, the real-time session may be completed using a best effort manner.

Given the importance of a real-time session, for example, a voice call, the paths may replicate the session traffic through more than one of the paths to provide better resiliency. When packets are lost through one of the paths, the replication of the session may provide a decreased effective packet loss. When the same session is carried via multiple paths, packets may not be received at the same time due over the paths. The system may use a slip buffer at the receiver to provide a minimum jitter. The depth of the slip buffer may be slightly greater than a delay difference between the paths used for communicating the session. In some embodiments, when the delay difference between the paths is negligible (for example, when a similar constellation is used for the paths), the NTP may use a multi-path configuration for the session. In some embodiments, when the delay difference is large (for example, when one path traverses a GEO satellite and the other traverses a LEO satellite), the NTP may decline to replicate the session. Duplication of a traffic session may also be effective or of use for other high value QoS traffic, such as a credit card transaction, a secret business traffic similar to a credit card transaction, or a safety critical transaction.

Beam Overlapping Areas:

In a spot-beam satellite configuration, load balancing of terminals in and overlapping area of adjacent beams or on a beam border, a terminal may be serviced by either of the adjacent beams. A statically assigned terminal to one of the beams to provide load balancing of terminals may not be feasible or maybe difficult due to the dynamic nature of traffic.

In some embodiments, when a remote site is deployed on the border or overlapping area, two paths may be configured such that each path uses a different beam. As such, the path selection at the time of network congestion may be dynamically taken by the NTP based on the current load of traffic through the beams.

Support for Standard Protocols

Quick UDP Internet Connections (QUIC) is a transport layer network protocol that supports a set of multiplexed connections between two endpoints over User Datagram Protocol (UDP), and was designed to provide security protection equivalent to TLS/SSL, along with reduced connection and transport latency, and bandwidth estimation in each direction to avoid congestion. QUIC's may provide improved perceived performance of connection-oriented TCP applications. QUIC moves control of the congestion avoidance algorithms from the kernel space to the application space at both endpoints.

QUIC uses the Connection UUID identifier to provide a unique connection. The connection ID is transmitted in the clear. The transport aware bonding and redundancy described herein may be applied to a QUIC session.

Transport Aware Bonding and TCP Acceleration

Satellite networks may use TCP acceleration for propagation of TCP sessions over a satellite link. At the NTP site, multiple client devices may necessitate multiple simultaneous TCP sessions.

The NTP at the receiver may reorder and reassemble the split traffic by handling differences in propagation and queuing path delay. The TCP connection travels through the paths simultaneously by splitting some packets across the paths. This may provide better statistical multiplexing of the traffic and a higher throughput on an individual TCP connection.

In some embodiments, a TCP connection remains through one path at a time, but can move across the paths. The NTP may select a path a connection for each spoofed TCP connection by distributing the TCP connections across the paths and move the connection to the other path, for example, when the assigned path experiences signal quality degradation or a complete failure.

When the connection moves around, the end to end TCP connection is maintained with spoofing by a TCP Performance-enhancing proxy (PEP). With the presence of multiple paths, there may be a PEP backbone on each of the paths. In some embodiments, the NTP at the transmitter may host the TCP PEP with a peer TCP PEP at the receiver. Typically, one PEP backbone connection is created between peers for each traffic class. Multiple TCP connections from the same priority or traffic class are multiplexed in one PEP backbone connection. In some embodiments, a PEP backbone connection may use a satellite friendly protocol like PEP Backbone Protocol (PBP) to spoof TCP packets between the peers. The application of PBP backbone may be provided by a TCP Spoofing Kernel (TSK). For each spoofed TCP connection, a TSK connection is created between the PEP peers over the satellite link. TSK also terminates its upstream TCP connections and acts as TCP peers with them.

In some embodiments, the PEP backbone connection may be created between peers per traffic class and per communication path. For example, when the network supports five traffic classes and two paths, a total of ten (10) PEP backbone connections can be created. Spoofed TCP connections maybe assigned to a corresponding PEP backbone based on a classification of the connection. When a TCP connection is moved between paths, the TCP connection may move between the PEP backbones.

In some embodiments, the same path maybe selected for the return and forward traffic of the TCP connection, and one PEP backbone is used. In some embodiments, two different paths are selected for the return and forward traffic of a TCP connection, and two different PEP backbones are used for the same TCP connection. The NTP at one end may select an inbound or return path, whereas the peer at the other end may select a different path for the forward link path for the TCP connection. In some embodiments, the TCP connection maybe moved to a different path and PEP backbone when the current path degrades. In some embodiments, occurrence of multiple transport metrics or condition changes may prompt a dynamic selection of the forward and return paths of the TCP connection. For example:

A determining of the type of TCP application is associated with a TCP session may be performed. The type of traffic may be bulk, streaming or interactive. When the session is bulk, the session may be download centric, upload centric. or suggest a simultaneous download and upload.

To be responsive during an interactive TCP session or connection, the PEP may continuously evaluate the round-trip time (RTT) of the paths. The NTP may select the path with a lower RTT and a lower error rate. In some embodiments, for an interactive TCP session, the NTP may select only one path from the sessions instantiation to the death when this type of TCP connection is initiated. The PEP may use a static or dynamic scheme to determine whether a TCP session is interactive or not. The static scheme may map or designate a specific TCP destination port or the like as an interactive session. In the dynamic scheme, the type of a TCP session may be determined by machine learning and predictive analysis, or a Deep Packet Inspector. In some embodiments, when many different types of TCP sessions are present, the path selected for the interactive TCP session may be determined by selecting the path using a more robust MODCOD.

Streaming TCP sessions may survive with a little bit error on a path or link. In some embodiments, when a streaming TCP session and the lesser error link is congested, and enough bandwidth is not available, then the NTP may select the higher error link path for the streaming TCP sessions. This allows for load balancing across paths when different kinds of TCP connections use the paths. TCP includes an in-built retransmission mechanism of TCP to provide reliability that enable recovery of lost packets via retransmission. Other protocols, such as PEP, may also provide reliable data transfer. But UDP based may not tolerate much error. As such, the NTP may select the lesser error link for a UDP streaming service. In some embodiments, the NTP may select the lesser error link even when the available bandwidth less than the bandwidth for the higher error link.

After selecting paths for interactive and streaming TCP sessions, the NTP may select a path to deliver best effort type of bulk TCP upload and/or down load sessions. The NTP may select that presently provides a larger bit rate for the bulk session. As a bulk session may be long-lived, these sessions may be subject to multiple movement among the paths. In exemplary embodiment, the interactive and streaming sessions may be allocated before the bulk session, and the remaining bandwidth may be allocated to the bulk session. The path selected for a bulk traffic class may depend on a policy or a plurality of policies, such as cost.

Upon reclassification a session may move between the paths. For example, a connection initially detected as interactive may be reclassified to streaming. The NTP may select another path upon the re-classification.

The ability to move connections among the paths may provide a make before break type of operation when a path degrades sufficiently to be classified as unavailable, In some embodiments, the NTP may select different paths for the return and forward directions of a TCP connection as traffic characteristics may be different for the two directions. For example, the forward link may be classified as bulk, while the return link may be classified as non-bulk, for example, when the return link mostly sends acknowledgments. The NTP may use a different link type for the two directions. One path may use Time Division Multiple Access (TDMA) while the other path uses Single Channel Per Carrier (SCPC). In some embodiments, the NTP may send constant bit rate TCP sessions through the SCPC link and time varying TCP sessions via the TDMA link.

When a TCP connection enhanced by PEP is moved across paths the TCP connection may also move across PEP backbones. The movement across the PEP backbone maintains the continuity of the TCP connection and avoids out of order packets. For example, GEO satellites generally have a large propagation delay and therefore some amount of acknowledgment packets may be in transit and remain unacknowledged. When a TCP connection is moved to a different path, some packets may be in transit on the older or previous path. When packets sent on the older path need to be retransmitted, they will be retransmitted through the older path. The receiving end may provide a process to reorder data as illustrated in FIG. 3.

Figure 3:
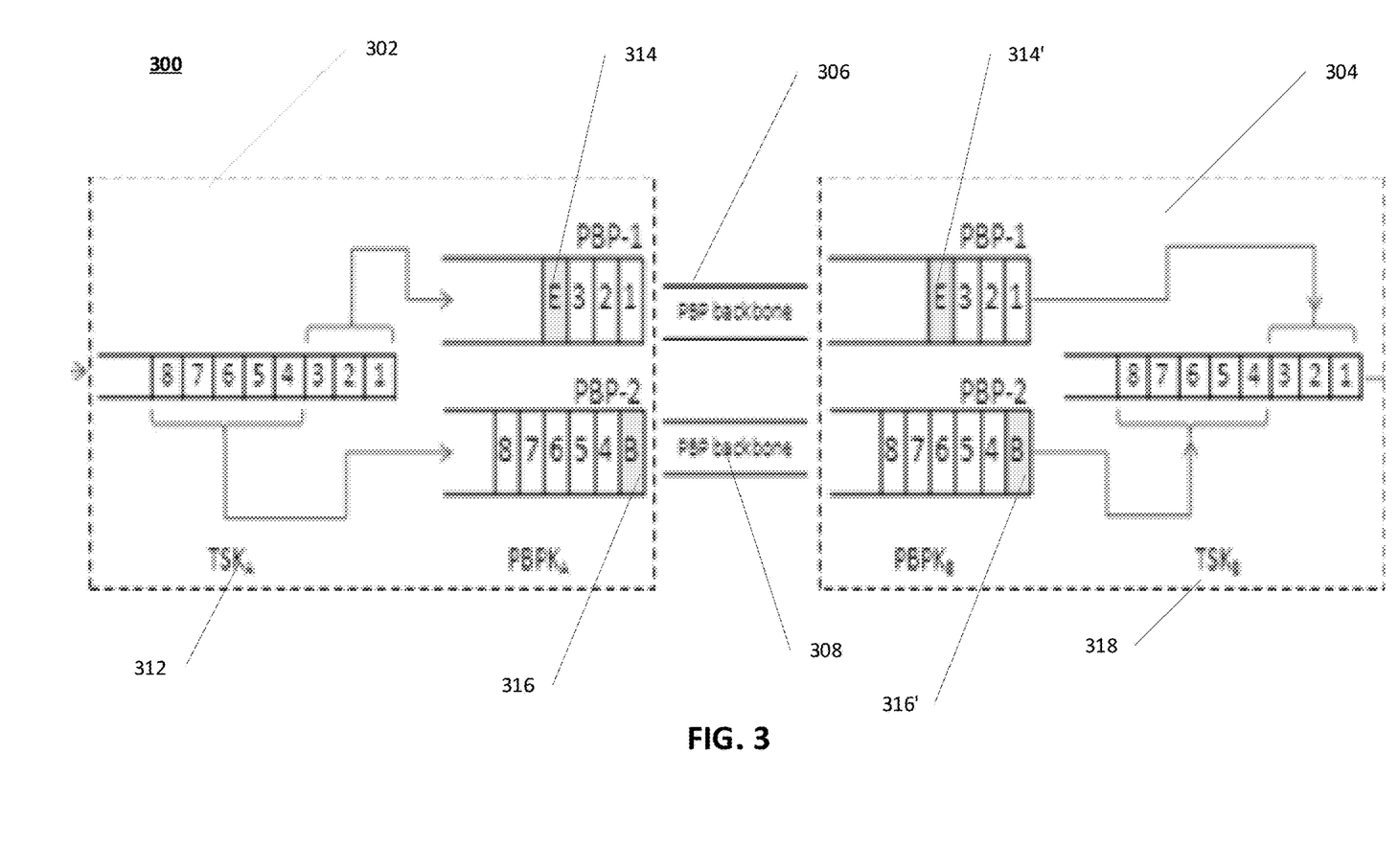
FIG. 3 illustrates moving a TCP Spoofing Kernel (TSK) connection across a PEP Backbone according to various embodiments.

FIG. 3 illustrates a process of moving a TCP Spoofing Kernel (TSK) connection across a PEP Backbone according to various embodiments.

FIG. 3 illustrates a process 300 of moving an in-progress TSK connection across a PEP-endpoint 302 and combining the TSK flow at a PEP endpoint B 304, using marker messages. In the process 300, the PEP-endpoint 302 and the PEP-endpoint 304 are connected via an old PBP backbone 306 (queue PBP-1). In some embodiments, moving of a TSK connection (and thus the corresponding TCP connection) may use two TSK Marker Messages 314, 316. When the PEP endpoint 302 moves a TSK connection from the old PBP backbone 306 to a new PBP backbone 308 (queue PBP-2), a TSK in the PEP endpoint 302 sends two Marker Messages 314, 316 to a Peer TSK in the PEP endpoint 304. The first marker message 314 is sent on the old PBP backbone 306 (through old path) to signal that this is the last packet on the old PBP backbone 306 (referred to as END_MARKER 314 from here onwards). In exemplary embodiments, the old PBP backbone 306 may utilize an old path connected to an NTP, and the new PBP backbone 308 may utilize a new path also connected to the NTP. In some embodiments, NTP endpoints may coincide with the PEP-endpoint 302 and PEP-endpoint 304. The second message 316 is sent on the new PBP backbone 308 (through new path) to signal the peer TSK that this is the first packet on the new backbone 308 (referred to as BEGIN_MARKER 316 from here onwards). The peer TSK at the PEP endpoint 304 uses the corresponding marker messages 314', 316' to identify the continuity of a TSK connection and to identify a backbone on which a retransmission request is sent for a packet loss.

As shown in FIG. 3, packets 1 through 8 for a TSK connection are buffered at a TSK queue identified as $TSK_A$ 314 at the PEP endpoint 302. Initially, the TSK connection to be moved is mapped and queued at a PBP backbone identified as the old PBP backbone 306 by the PEP endpoint 302. Packets received at PEP endpoint 302 before an END_MARKER trigger (not shown), i.e., packets numbered 1, 2 and 3 are queued in the old PBP backbone 306 queue. Upon receiving an END_MARKER trigger (not shown) indicating a path change, the $TSK_A$ 312 moves subsequent packets for $TSK_A$ 312 to the new PBP backbone 308. The TSK queues the END_MARKER message 314 on the old PBP backbone 306. Before queuing any user data packets on the new backbone 308, $TSK_A$ 314 queues a BEGIN_MARKER message 316 (identified as B) on the new PBP backbone 308. The BEGIN_MARKER message 314 indicates to the peer TSK that the packet numbered 4 is first packet on the new PBP backbone 308 belonging to the $TSK_A$ 312 connection.

The PEP backbone protocol ensures that packets on a backbone are delivered in-order. If the END_MARKER message 314' arrives before the BEGIN_MARKER message 316', packets are received in sequence at $TSK_B$ 318, so the TSK Marker Messages are discarded. If the BEGIN_MARKER message 316' arrives before the END_MARKER message 314', $TSK_B$ 318 starts queuing everything it receives from the new backbone 308 while it continues to forward everything it receives from the old backbone 306. When the END_MARKER message 314' arrives on the old backbone 306, the TSK Marker Messages 314', 316' are discarded and all the queued traffic for the new backbone 308 is treated as if it just arrived, in order.

Various error scenarios may arise in moving a TSK connection form one backbone to another. The following abbreviations are used;
X indicates a delayed marker packet
BEGIN_MARKER message is abbreviated as B
END_MARKER is abbreviated as E
Case 1: Out of Order Packets Across PBP Backbones
It could happen that the packets B, 4, 5, 6, 7, 8 on PBP-2 reach an associated Proxy Backbone Protocol Kernel (PBPK), $PBPK_B$, before packets 1, 2, 3 and E from PBP-1. $PBPK_B$ does not wait for packets 1, 2, 3 on PBP-1 and delivers the packets 4, 5, 6, 7, 8 to $TSK_B$. Note that the PBPK does not guarantee in-order delivery across multiple backbones. By using the marker packets the TSK delivered the packets from two backbones in-order to the end hosts.
Packets Sent from $PBPK_A$: 1, 2, 3, E, B, 4, 5, 6, 7, 8
Packets Received at $PBPK_B$: B, 4, 5, 6, 7, 8, 1, 2, 3, E
When $TSK_B$ receives Marker Message B it operates in "match marker packets" mode. As a result, $TSK_B$ waits for matching Marker Message E, before sending the packets 4, 5, 6, 7, 8 to the end host. $TSK_B$ receives packets 1, 2 and 3 from the PBP and delivers to the end host. When the matching marker packet (E) is received, the TSK discards the marker packets and forwards packets 4, 5, 6, 7 and 8 to the end host.
Case 2: Delayed Marker Packets at PBPK:
Marker Message (B) on the new PBP backbone is delayed:
Packets Sent from $PBPK_A$: 1, 2, 3, E, B, 4, 5, 6, 7, 8
Packets Received at $PBPK_B$: 1, 2, 3, E, X, 4, 5, 6, 7, 8
Upon receiving the marker message E $TSK_B$ operates in a "match marker packets" mode. $PBPK_B$ does not deliver packets 4 through 8 to $TSK_B$ when packet B is delayed. Upon receiving packet B $PBPK_B$ delivers the sequence of packets B, 4, 5, 6, 7, 8 to $TSK_B$. As such, $TSK_B$ has the matching marker packets and a correct sequence of packets to be delivered to the end host.
Case 3: Marker Message (E) on the Old PBP Backbone is Delayed:
Packets Sent from $PBPK_A$: 1, 2, 3, E, B, 4, 5, 6, 7, 8
Packets Received at $PBPK_B$: 1, 2, 3, X, B, 4, 5, 6, 7, 8
If $PBPK_B$ receives packet 1, 2, 3 but not E on PBP-1, $PBPK_B$ delivers packet 1, 2 and 3 to $TSK_B$ as they are in sequence. Now, if $TSK_B$ receives packet B, 4, 5, 6, 7, 8 from PBP-2, $TSK_B$ starts queuing all the packets until a matching marker packet E is received from the PBPK. However, $TSK_B$ delivers packets 1, 2 and 3 to end host and waits for the matching packet (i.e., packet E). When $PBPK_B$ delivers the marker packet E, $TSK_B$ delivers the queued packets (4, 5, 6, 7 and 8) to the end host, discarding the matching marker packets.
Case 4: Both the Marker Messages are Delayed:
Packets Sent from $PBPK_A$: 1, 2, 3, E, B, 4, 5, 6, 7, 8
Packets Received at $PBPK_B$: 1, 2, 3, X, X, 4, 5, 6, 7, 8
$PBPK_B$ ensures packets 4, 5, 6, 7, 8 are not delivered to the $TSK_B$ without packet B. Hence, $TSK_B$ receives only packets 1, 2, 3 from $PBPK_B$. $TSK_B$ sends packets 1, 2 and 3 to the end host. $PBPK_B$ does not deliver packets 4, 5, 6, 7 and 8 to $TSK_B$ without packet B. Hence either packet sequence B, 4, 5, 6, 7 and 8 are delivered to $TSK_B$ before packet E or packet E is delivered before packets B, 4, 5, 6, 7 and 8. These two scenarios are discussed above.

Case 5: Packet Loss (Data Packet or Marker Packet)
When TCP sessions are moved from one path to another, in-flight or in-transit packets on the old backbone path may never arrive at the receiver through the old path or backbone.

The PBP protocol supports retransmission timer, delayed ACK, basic selective acknowledgement and selective ack with poll. In some embodiments, a recovery attempt is made after two times of expiry of retransmission timer. In recovery, the sender will send a PBP poll message. As the old path is gone or nearly gone, the sender will not receive a poll ACK from the receiver. After a timeout, all unacknowledged packets from the old path will be retransmitted through the new path. However, the two different PEP backbones maintain their own sequence number space. On the new path, a cross backbone marker packet containing the start sequence number (the sequence number of the first unack packet) of unack packet may be transmitted before sending unack user packets. The receiver waits for the E marker when the B marker is received before the E marker. Upon seeing the across backbone marker, the receiver may interpret that subsequent packets until the E market are to be delivered to the end host before delivering any packets through the new path.

In some embodiments, high value traffic may be duplicated in both paths and the receiver may filter out the duplicated packets.

Figure 4:
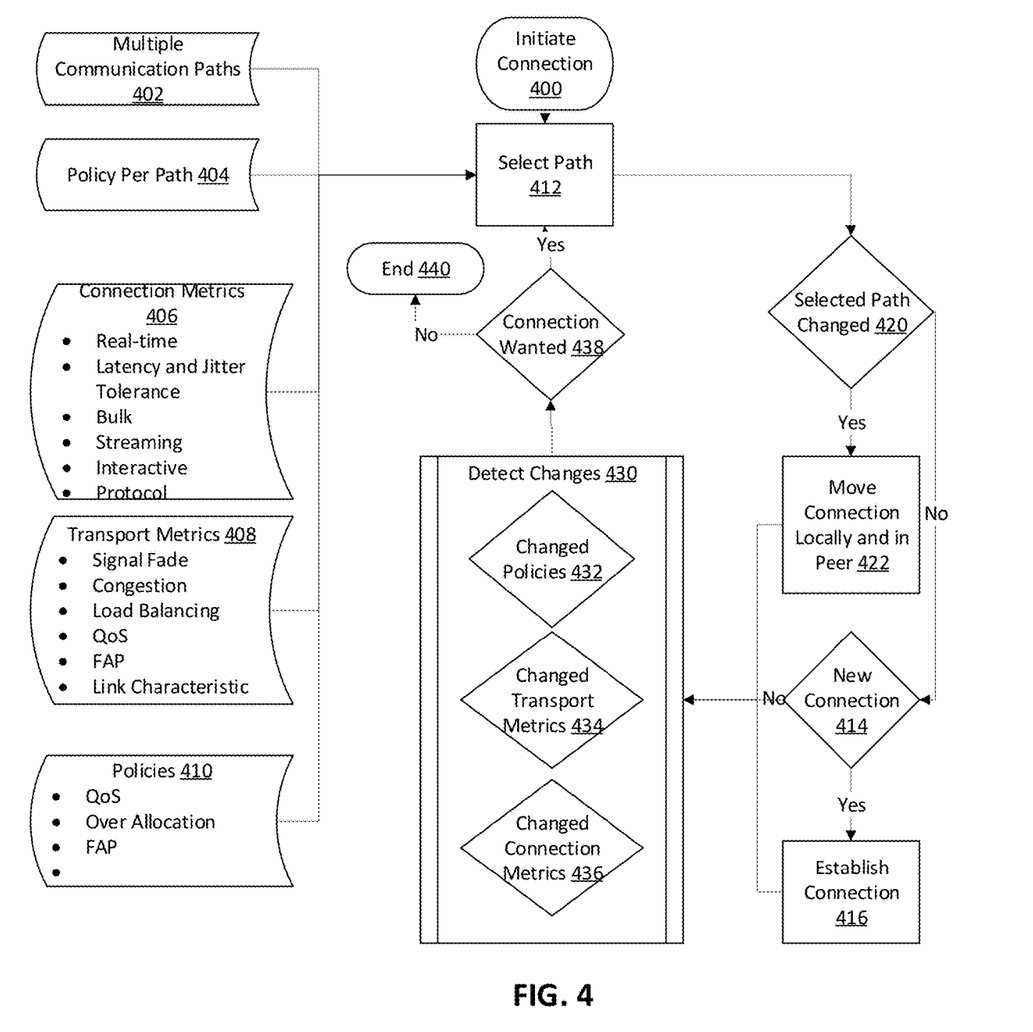
FIG. 4 illustrates a process for selecting and moving a communications path according to various embodiments.

FIG. 4 illustrates a process for selecting and moving a communications path according to various embodiments.

FIG. 4 illustrates a process 400 for selecting and moving a communications path. The process 400 includes initiating a connection. The initiating of a connection starts by selecting a path with operation 412. The operation 412 retrieves available multiple communication paths data 402 and policies per path data 404. The operation 412 also retrieves, for a given path, connection metrics 406, transport metrics 408, and policies 410. Operation 412 then selects a path based on the retrieved data 402, 404, 406, 408, 410 as disclosed above.

The process 400 then determines if the selected path has changed at operation 420. When the selected path has changed at operation 420, process 400 moves the connection, locally and at a peer, to the selected path at operation 422 based on the retrieved data 402, 404, 406, 408, 410 as disclosed above. After operation 422, process 400 begins to detect changes at the link/transport layer at operation 430. Operation 430 to detect changes may include an operation 412 to detect changed policies in data for policies 410, an operation 412 to detect changed transport metrics 424 for the transport metrics 410, and an operation 436 to detect changed connection metrics 436 for the connection metrics 406. In exemplary embodiments, operation 420 does not consider initiation of a new connection as changing a selected path. When operation 420 determines that a selected path has not changed, process 400 determines whether operation 412 of selecting a path was initiated in response to a new connection request at operation 414. When operation 414 determines that the connection was initiated in response to a new connection request, the process 400 establishes a connection per the request at operation 416. When operation 440 determines that the connection was not initiated in response to a new connection request, the process 400 begins to detect changes at the link/transport layer at operation 430.

That detect changes operation 430 detects changes to the connection metrics 406, the transport metrics 408, and the policies 410. When operation 430 detects changes, the process 400 determines whether the connection is still wanted at operation 438. If the connection is to be shut down, process 400 ends at operation 440. If the connection is still needed, process 400 per operation 412 as described above. In some embodiments, the operation 412 of selecting a path may be invoked when the process 400 detects changes at operation 430 described below.

In exemplary embodiments, the connection metrics 406 may include metrics that indicate whether a connection is a real-time connection, is tolerant of latency and jitter, is a bulk connection, is an interactive connection, a protocol in use on the connection, and other connection specific metrics.

In exemplary embodiments, the transfer metrics data 408 may include metrics that indicate whether the transport/path/link is experiencing a signal fade, is congested, needs to be load balanced, is working in accordance with quality of service requirements, is working in accordance with the FAP of the path, or other transport/path/link specific metrics.

In exemplary embodiments, the policies data 410 may indicate whether policies associated with the connection such as quality of service, over allocation, FAP, path or the like. The policies data 410 may be at a subscriber level, a path level, the system level, a VNO level, a beam level, a gateway level, or the like.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A method for using multiple communication paths in a satellite network, the method comprising:
    initiating a connection request from a first peer to a second peer;
    providing communication paths between the first peer and the second peer;
    retrieving a policy corresponding to the communication paths, the first peer and the second peer;
    receiving a transport metric for at least one of the communication paths;
    selecting a path from the communication paths based on a connection metric, the transport metric and the policy; and
    establishing a connection between the first peer and the second peer with the path,
    wherein at least one of the communication paths is relayed by a satellite and the selecting comprises selecting based on a predictive analysis of a historical behavior of at least one of the communication paths.

2. The method of claim 1, wherein the transport metric is selected from one or more of a frequency band, a satellite constellation, an antenna, a carrier frequency, a gateway identification, an outdoor unit, a Packet Loss Rate (PLR), a Modulation and Coding (MODCOD) symbol rate, a MODCOD modulation, a signal strength, a transport layer queue depth, a transport layer queue latency, a link type or a combination thereof.

3. The method of claim 2, wherein the path is relayed by the satellite, and the transport metric comprises a metric of the path.

4. The method of claim 2, further comprising:
    detecting, on the path, a change in one or more of the connection metric, the transport metric or the policy; and
    moving the connection to a second path based on the change, wherein the second path comprises another of the communication paths.

5. The method of claim 4, wherein
    the second path has a metric differing from a corresponding transport metric of the path.

6. The method of claim 1, further comprising:
    detecting, on the path, a change in one or more of the connection metric, the transport metric or the policy; and
    moving the connection to a second path based on the change, wherein the second path comprises another of the communication paths.

7. The method of claim 6, wherein the connection comprises a Performance-enhancing Proxy (PEP) connection.

8. The method of claim 6, wherein the connection comprises a TCP spoof connection.

9. The method of claim 6, further comprising:
    sending traffic for the connection over the second path;
    receiving the traffic for the connection over the second path; and
    maintaining an integrity of the received traffic.

10. The method of claim 1, wherein the selecting comprises selecting a plurality of paths from the communication paths as the path and the method further comprises:
    sending traffic for the connection by replicating the traffic over the plurality of paths;
    receiving the traffic for the connection over the plurality of paths; and
    maintaining an integrity of the received traffic by discarding a duplicate of the received traffic.

11. The method of claim 1, wherein the policy is selected from one or more of a Fair Access Policy (FAP), an allocated bandwidth, a maximum bandwidth, an allowed MODCOD, or a Quality of Service requirement.

12. The method of claim 1, wherein one of the communication paths comprises a terrestrial path, the connection is intolerant of a long latency or jitter, and the selecting comprises selecting the terrestrial path for the connection.

13. A method for using multiple communication paths in a satellite network, the method comprising:
    providing a first Virtual Network Operator (VNO) comprising a first VNO connection and a second VNO comprising a second VNO connection;
    initiating a connection request from a first peer to a second peer;
    providing communication paths between the first peer and the second peer;
    retrieving a policy corresponding to the communication paths, the first peer and the second peer;
    receiving a transport metric for at least one of the communication paths;
    selecting a path from the communication paths based on a connection metric, the transport metric and the policy; and establishing a connection between the first peer and the second peer with the path,
wherein at least one of the communication paths is relayed by a satellite, and the selecting comprises selecting the path for the first VNO connection and selecting another of the communication paths for the second VNO connection, and the path and the another of the communication paths are relayed by the satellite.

14. The method of claim 1, further comprising:
providing a first Virtual Network Operator (VNO) comprising a first VNO connection and a second VNO comprising a second VNO connection; and
distributing bandwidth of the communication paths for the first VNO and the second VNO per a bandwidth allocation by a resource manager,
wherein the selecting comprises selecting the path for the first VNO connection and selecting another of the communication paths for the second VNO connection, and the path and the another of the communication paths are relayed by the satellite.

15. A method for using multiple communication paths in a satellite network, the method comprising:
initiating a connection request from a first peer to a second peer;
providing communication paths between the first peer and the second peer;
retrieving a policy corresponding to the communication paths, the first peer and the second peer;
receiving a transport metric for at least one of the communication paths;
selecting a path from the communication paths based on a connection metric, the transport metric and the policy;
establishing a connection between the first peer and the second peer with the path;
managing the first peer or the second peer via the path; and
altering a configuration of the first peer or the second peer while maintaining communications over another of the communication paths for a hitless configuration upgrade,
wherein at least one of the communication paths is relayed by a satellite.

16. The method of claim 1, further comprising:
managing the first peer or the second peer via the path; and
wherein the managing comprises communicating via the path when another of the communication paths is unavailable.

17. The method of claim 1, wherein the connection metric comprises one or more of a real-time connection indicator, a latency and jitter tolerance, a bulk connection, an interactive connection, or a protocol in use on the connection.

18. The method of claim 1, wherein the transport metric is selected from one or more of a satellite constellation, an antenna, a carrier frequency, a gateway identification, an outdoor unit, a Packet Loss Rate (PLR), a Modulation and Coding (MODCOD) symbol rate, a MODCOD modulation, a signal strength, a transport layer queue depth, a transport layer queue latency, a link type or a combination thereof.

19. The method of claim 13, further comprising distributing bandwidth of the communication paths for the first VNO and the second VNO per a bandwidth allocation by a resource manager.

* * * * *